L. RIAL & W. HEBERN.
STEERING WHEEL LOCK.
APPLICATION FILED OCT. 29, 1917.
1,300,020.
Patented Apr. 8, 1919.
2 SHEETS—SHEET 1.
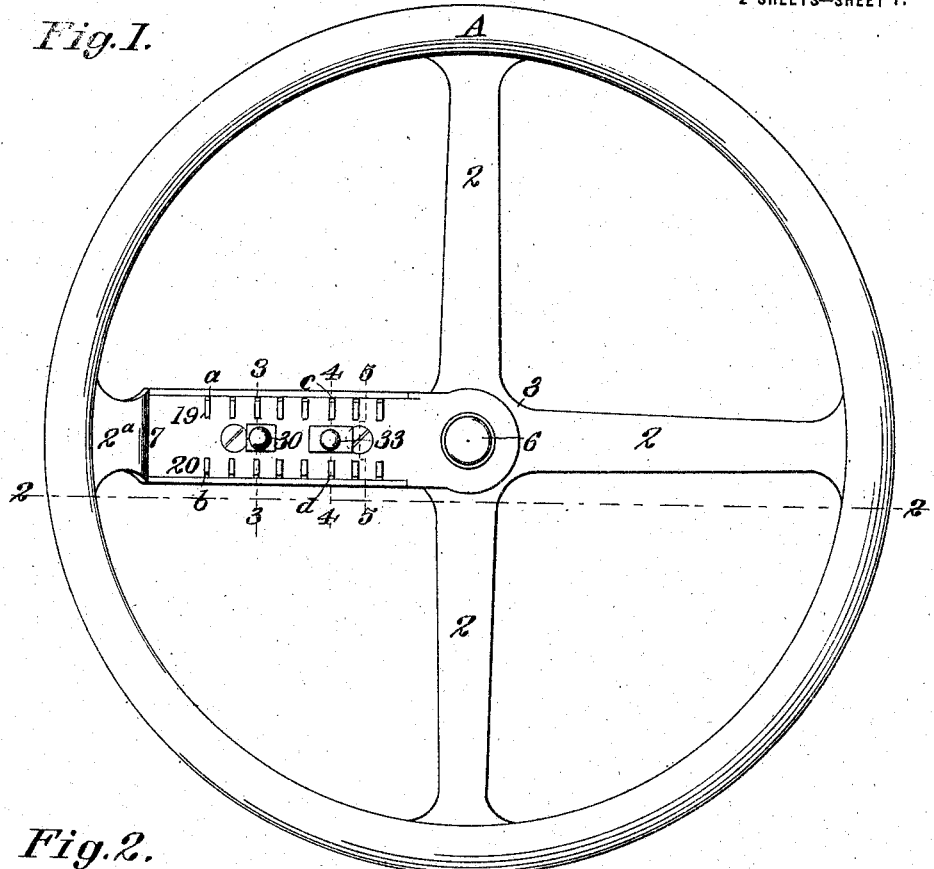
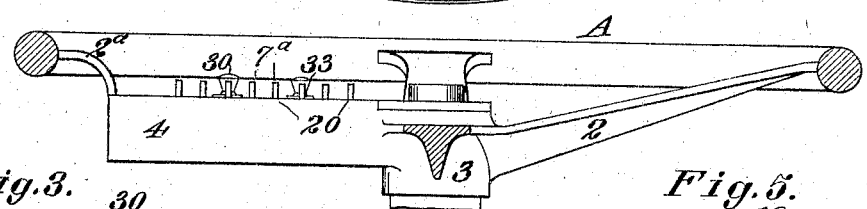
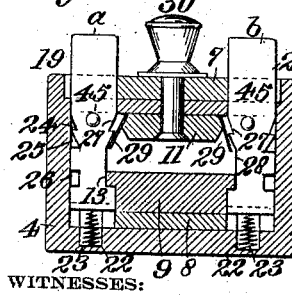
WITNESSES:
Charles Pickles
J. C. Benesch.
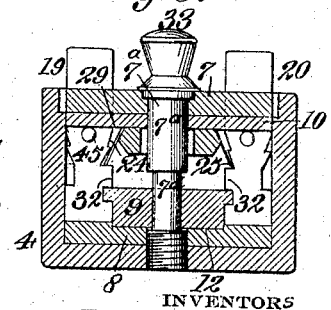
INVENTORS
Lee Rial
William Hebern
BY Strong & Townsend
ATTORNEYS

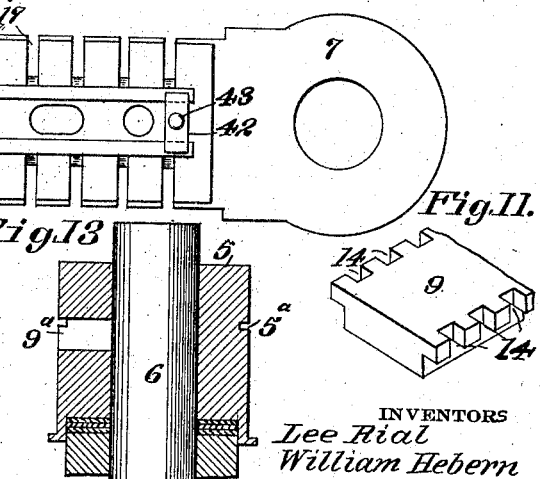

UNITED STATES PATENT OFFICE.

LEE RIAL AND WILLIAM HEBERN, OF SAN FRANCISCO, CALIFORNIA; SAID HEBERN ASSIGNOR TO E. J. McLAUGHLIN AND J. F. SULLIVAN, BOTH OF SAN FRANCISCO, CALIFORNIA.

STEERING-WHEEL LOCK.

1,300,020.   Specification of Letters Patent.   Patented Apr. 8, 1919.

Application filed October 29, 1917.   Serial No. 199,003.

*To all whom it may concern:*

Be it known that we, LEE RIAL and WILLIAM HEBERN, citizens of the United States, residing at the city and county of San Francisco and State of California, have invented new and useful Improvements in Steering-Wheel Locks, of which the following is a specification.

This invention relates to a device for rendering the steering mechanism of an automobile or like vehicle inoperable during the absence of the owner or driver to prevent unauthorized persons from stealing or using the vehicle.

One of the objects of the invention is to provide a steering wheel, a combination permutation lock, and a bolt operated thereby to permit the wheel to be released or locked with relation to the steering column of a car. Another object of the invention is to provide a combination lock which permits locking of the bolt both in the released and in the locked position, and also to provide a lock which obviates the necessity of carrying a key and which is so constructed that the locking combination may be readily changed from time to time as conditions may demand, provided the one who desires to make the change already knows the present combination. Further objects will hereinafter appear.

The invention consists of the parts and the construction and combination of parts as hereinafter more fully described and claimed, having reference to the accompanying drawings, in which—

Figure 1 is a plan view of an ordinary steering wheel, showing the application of the invention.

Fig. 2 is a side elevation of same, partly in section, said section being taken on the line 2—2 of Fig. 1.

Fig. 3 is an enlarged cross section on line 3—3 of Fig. 1.

Fig. 4 is an enlarged cross section on line 4—4 of Fig. 1.

Fig. 5 is an enlarged cross section on line 5—5 of Fig. 1.

Fig. 6 is a longitudinal, vertical section through one side of the locking mechanism.

Fig. 7 is a similar section taken directly through the center of the locking mechanism.

Fig. 8 is a plan view, showing the cover plate, upper bearing plate and the releasing plate removed.

Fig. 9 is a bottom view of the cover plate, bearing plate and releasing plate, showing the three plates assembled and the normal positions maintained between the same.

Fig. 10 is a perspective view of one of the keys employed.

Fig. 11 is a perspective view of a portion of the locking bolt.

Fig. 12 is a detail plan view of the collar, showing a split bushing interposed between the steering column and the collar.

Fig. 13 is a vertical section through the collar, showing it raised by the interposition of a plurality of washers.

Referring to the drawings in detail, A indicates the rim of an ordinary steering wheel, 2 the spokes, and 3 the hub. Formed integral with one of the spokes, as shown at 2ª, is a lock housing or casing 4, and forming a covering for said housing and a collar 5, secured upon the steering column 6, is a plate 7. Slidably mounted on a bearing plate 8 secured in the bottom of the casing is a locking bolt 9, and slidably mounted on a bearing plate 10 secured to the cover plate 7 is a releasing plate 11.

A bearing plate 8 is provided with a guideway 12 for bolt 9, and on each side of the locking bolt is an outwardly projecting flange 13 which is notched, as shown at 14, along the whole length of the bolt and on each side of same. In the bottom bearing plate and on each side thereof are eight slots, such as shown at 15 and 16, and in the upper bearing plate and also in the cover plate 7 is a similar number of alined slots 17 and 18. Vertically positioned key members 19 are received by the alined slots 15 and 17 and a like number of key members 20 are received by the alined slots 16 and 18. The keys are sufficiently long to project a suitable distance above the cover plate 7, as shown at 7ª, (see Figs. 1, 2 and 6) and may, therefore, be readily manipulated when the locking mechanism is to be released or locked.

In the bottom section of the casing 4 and also in the lower bearing plate 8, in alinement with each set of slots 15 and 16, are chambers 22, and adapted to be housed by said chambers and interposed between the lower end of each key and the bottom section of the casing is a coil spring 23. These coil springs normally serve the function of supporting each key in a raised or projected position and they also serve the function of raising the keys when they are released by the releasing plate 11, as will hereinafter be described.

Each side of each key is notched, as shown in Figs. 3, 4, 5 and 10. One notched side may be called the combination side while the opposite side may be called the free side. The free side of each key is provided with notches, such as shown at 24, 25 and 26, while the combination side of each key is provided with two notches, such as shown at 27 and 28. The upper notches 24 and 27 are formed on the same plane and are provided for the purpose of receiving a locking spring, such as shown at 29. There is one locking spring for each key (sixteen in all) and these springs are secured to each side of the releasing plate 11, and as the releasing plate normally assumes the position shown in Fig. 9, which maintains each spring in alinement with the key, it can readily be seen that depression of any individual key against the tension of the springs 23 will permit a spring 29 to engage one or another of the notches 24 and 27 and lock the key against upward movement. The release of a key thus locked can only be accomplished by moving the sliding plate in the direction of arrow $a$ by means of a knob 30 secured to the plate, as shown in Fig. 7; this movement of the sliding plate and the springs carried thereby being permitted as the cover plate is slotted, as at 31, to allow such movement. The sliding movement thus transmitted to the plate moves the springs 29 out of alinement with each key laterally and, therefore, disengages each spring and permits the keys to return to normal raised position, due to the tension of the springs 23.

Any number of keys may be employed in the combination for the purpose of releasing or locking the bolt 9. The keys thus employed for locking or releasing the bolt are turned to the position shown in Figs. 3 and 4; that is, the combination sides of the keys are presented toward the slotted flanges 13 of the locking bolt. The keys that are not employed in the combination remain in their normal position and present their combination sides outwardly toward the sides of the casing, as shown in Fig. 5.

In actual operation, supposing the keys marked $a$, $b$, $c$ and $d$ (see Fig. 1) are employed as locking members. Then it is only necessary to depress said keys, as shown in Fig. 4, to permit the bolt to be retracted with relation to a slot 9ª formed in the collar 5. This is accomplished as follows: By referring to Fig. 4 it will be seen that depression of the keys $c$ and $d$ has lowered them to a point where the upper notches 27 have become engaged and locked by the springs 29. It can also be seen that the lower notches 28 have assumed a position below the slotted flanges 13 of the bolt which permits the bolt to travel freely.

The other position of the combination keys is shown in Fig. 3. They are here in the raised position and as such form locks for the bolt, as the lower ends of the keys are in a position where they enter the slots 14 of the flanges 13 on the locking bolt. The bolt cannot, therefore, be moved before the keys $a$ and $b$ in Fig. 3 have been depressed, nor can the bolt be moved if any other keys are depressed but the four specified, as the depression of keys not in the combination would cause a lug 32, on the free side of the key (see Fig. 5) to enter one of the channels formed in the flanges 13 of the bolt. Therefore it is essential that no keys but those employed in the combination, that is, keys $a$, $b$, $c$ and $d$ be depressed, as it will otherwise be impossible to move the bolt. The moment the depression of the combination keys has taken place it becomes possible to move the bolt by means of a knob 33 in the direction of arrow $b$ (see Fig. 7). This movement is possible as the flanges 13 on the bolt are in alinement with the lower notches, formed on the free sides of the keys, that are not employed in the combination and also because the flanges 13 are in alinement with the notches 28 formed in the combination keys as these have been depressed as described.

Retractile movement of the locking bolt is effected by a pull on knob 33 in the direction of arrow $b$. The steering wheel is in this manner released from the steering column and it also becomes possible to lock the bolt in this released position merely by releasing the combination keys that have been depressed; this being accomplished, as before described, by moving the knob and connected sliding plate 11 in the direction of arrow $a$.

The bolt, when locked in the released position, cannot be released until the combination keys are again depressed, nor can it be released or engaged with the collar until the wheel is turned to a position where the bolt is in alinement with the notch 9ª formed in the collar. It is, therefore, essential, when desiring to lock the wheel to the column, to first depress the combination keys and then turn the wheel to a position where the bolt will register with the notch 9ª to permit the bolt to enter and lock, the bolt being locked and secured in the locked position by again releasing the combination keys through a movement of the sliding plate. It is, therefore, essential to know the combination of the lock if it is desired to lock the wheel when the bolt is retracted to releasing position and also if it is desired to release the wheel to unlock it with relation to the steering column. Neither operation can be performed without knowledge of the combination.

The manner of securing the collar 5 to the steering column and also the manner in which the cover plate 7 is secured to the casing are important features of the present invention. The collar 5 is first secured to the column 6 by means of a key 6ª, then by a screw 6ᵇ, and then, by the cover plate 7, the cover plate being secured to the casing by means of two screws 7ᵇ. These screws pass through the cover plate 7, the upper bearing plate 10, the releasing plate 11, and the bolt 9 and are screwed into the lower bearing plate 8 in the bottom section of the casing, as shown at 7ᶜ. The center portion of each screw is turned down to reduce the diameter, as shown at 7ᵈ. These reduced portions operate in slots 9ᵉ which are formed in the bolt and provided between their ends with entrance openings or enlargements 9ᶠ through which the larger diameter of the screws may readily pass. This position is only assumed when the bolt is midway between a complete locking or a complete releasing position. Therefore it is necessary to know the combination of the lock so that the bolt may be released and moved to this position before it is possible to remove the screws which secure the cover plate 7 in place. It is impossible to lift the wheel or remove it from the steering column as it is first necessary to remove the cover plate and bolt before it is possible to lift the wheel off of the collar.

The wheel proper is also secured against upward movement on the collar by forming an annular groove therein, as shown at 5ª. A lip 9ᵈ, formed on the forward end of the bolt, projects into this groove when the bolt is retracted, and into the slot 9ª when the bolt is moved forward to locking position, the bolt being normally retained in the locking position by a spring 40 interposed between the rear end of the casing and the bolt. The retractile movement of the bolt is limited by a stop pin 41 secured to the rear end of the casing. This pin is of considerable importance as it prevents the bolt from being so far back that the lip 9ᵈ might move out of engagement with the annular groove 5ª; also it provides a positive stop which prevents the bolt from being moved into a position where the slots 14, formed in the flanges 13, might be out of alinement with the keys. It is necessary that an absolute alinement should be maintained between the keys and the slots 14 on the bolt, both when the bolt is retracted and extended, as it would otherwise be difficult to lock the bolt in either the extended or retracted position.

The sliding plate 11 may be secured to the upper bearing plate 10 in any suitable manner, but preferably as here shown by a cross bar 42 and a screw 43, the cross bar and screw permitting a sliding movement of the releasing plate, when desired, and also permitting retraction of the releasing plate to normal position by means of a spring 44. This spring is attached at one end to the cover plate and at the opposite end to the releasing plate.

The downward movement of the vertically positioned keys which coöperate with the locking bolt is, as before stated, limited by the bottom section of the casing. The upward movement is limited entirely by pins 45 extending through the keys which are adapted to engage the underside of the upper bearing plate 10. The keys, when raised, will all assume a normal plane and will also assume a normal plane if they should all be depressed, as their movement, both in an upward and downward direction, is positively limited; the actual movement in practice being approximately one-eighth of an inch while the extreme movement of the bolt proper is one-quarter of an inch. The forward end of the bolt which enters the slotted portion of the collar is, therefore, preferably slightly tapered, as shown at 46, to permit it to act as a wedge to tightly lock the wheel with relation to the collar and steering column and also to permit it to automatically take up the slight amount of wear which will naturally take place through continuous use.

The post or housing 6ᶜ, inclosing the lower part of the steering column, projects up into a recess formed in the bottom of the collar, as at 6ᵈ, while the upper end of the steering column is provided with a cap 6ᵉ which has its lower edge flanged, as at 6ᶠ, to engage beneath the plate 7. This construction completely incloses the steering column and makes it exceedingly difficult for an unauthorized person to connect the wheel thereto, when the bolt 9 is withdrawn from the slot 9ª.

Having thus described our invention, what we claim and desire to secure by Letters Patent is—

1. A permutation lock comprising a casing and a bolt slidable therein and formed with a plurality of notches in its opposite longitudinal side edges, spaced series of flat and non-rotatable keys having their outer sides slidably engaged with the adjacent sides of the casing for entering the bolt notches to lock the bolt against movement, certain of said keys being ineffective on the bolt but all the keys having catch-engaging recesses, a lock plate slidably mounted above the bolt in the casing, and downwardly divergent catch springs carried by the respective side edges of the plate for engaging in the recesses of the keys to hold the latter depressed.

2. A permutation lock including a casing, a bolt slidable thereon, spaced sets of keys slidable transversely of and on opposite sides of the bolt for normally locking the same, said keys having notches formed therein, a plate slidable between the sets of keys and provided with yieldable latch means engageable independently in the key notches to hold them inoperative and disengageable therefrom upon sliding the plate, and means for sliding the plate.

3. A permutation lock including a casing, a bolt slidable thereon, a plurality of keys slidable transversely of the bolt for normally locking the same, said keys having notches formed therein, a coiled spring yieldably supporting each key, a plate slidable transversely of the keys, a plurality of leaf springs secured to the plate for engaging in the key notches to hold them inoperative and removable from the key notches to free the keys, and means for sliding the plate.

In testimony whereof we have hereunto set our hands in the presence of two subscribing witnesses.

LEE RIAL.
WILLIAM HEBERN.

Witnesses:
JOHN H. HERRING,
CHARLES PICKLES.

Copies of this patent may be obtained for five cents each, by addressing the "Commissioner of Patents, Washington, D. C."